US 6,198,919 B1

(12) United States Patent
Buytaert et al.

(10) Patent No.: US 6,198,919 B1
(45) Date of Patent: Mar. 6, 2001

(54) METHOD AND APPARATUS FOR COMMUNICATING WITH AN OBJECT AND MODULE USED THEREBY

(75) Inventors: Steven Buytaert, Kessel-Lo; Luc Buntinx, Hasselt; Maes Marc, Genk; Guy Orens, Jeuuen, all of (BE)

(73) Assignee: SmartMove, n.v., Leuven (BE)

( * ) Notice: Subject to any disclaimer, the term of this patent is extended or adjusted under 35 U.S.C. 154(b) by 0 days.

(21) Appl. No.: 08/952,663

(22) PCT Filed: Apr. 26, 1996

(86) PCT No.: PCT/BE96/00047

§ 371 Date: Dec. 1, 1997

§ 102(e) Date: Dec. 1, 1997

(87) PCT Pub. No.: WO96/38996

PCT Pub. Date: Dec. 5, 1996

(30) Foreign Application Priority Data

May 30, 1995 (BE) .................................................. 9500478
Mar. 1, 1996 (BE) .................................................. 9600183

(51) Int. Cl.$^7$ ........................................................ H04Q 7/20
(52) U.S. Cl. ................................................................ 455/426
(58) Field of Search ............................ 342/457; 455/426, 455/425, 456

(56) References Cited

U.S. PATENT DOCUMENTS 5,371,493 * 12/1994 Sharpe et al. ................... 340/825.34
5,694,414 * 12/1997 Smith et al. ............................ 375/200

* cited by examiner

Primary Examiner—Theodore M. Blum
(74) Attorney, Agent, or Firm—Bacon & Thomas, PLLC

(57) ABSTRACT

A method for communicating with an object, for example a vehicle, using a wide area paging network and a cellular mobile communication network that includes the steps of coupling a module with at least a transmitter and a receiver to the object and using the module for communicating with in combination at least three communication networks, the first one being the wide area paging network, the second one being the cellular mobile communication network and the third one being a local network using a spread spectrum modulation method.

24 Claims, 5 Drawing Sheets

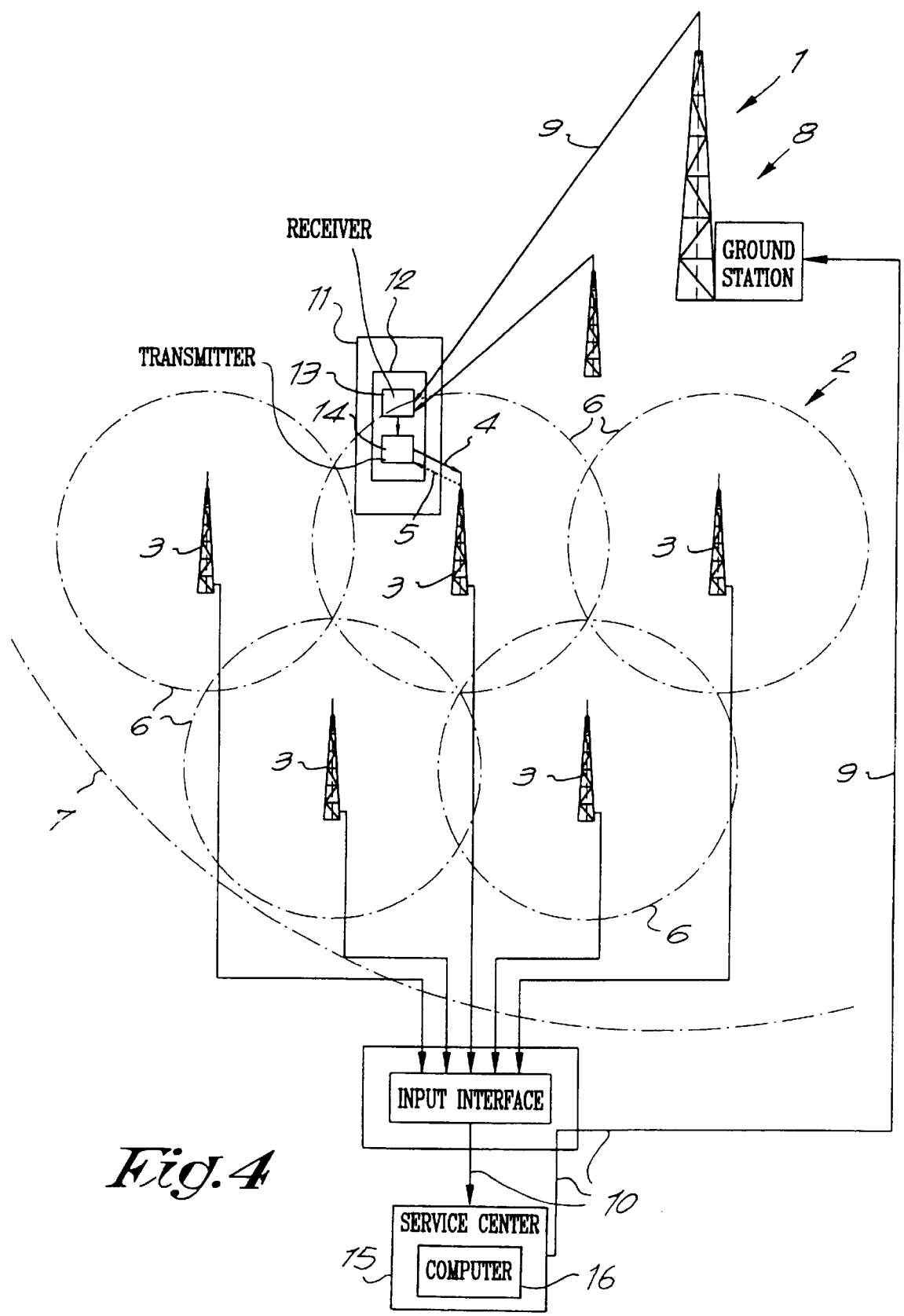

METHOD AND APPARATUS FOR COMMUNICATING WITH AN OBJECT AND MODULE USED THEREBY

BACKGROUND OF THE INVENTION

1. Field of the Invention

The invention relates to a method for communicating with an object, and to a module used by the object. The method can for instance be used for observing and/or localizing objects.

In the first place the invention serves to localize stolen objects, particulary vehicles, such as cars and trucks.

More generally the invention is applicable for also localizing objects other than vehicles, such as valuable pieces of art, stolen or not.

In the second place, the invention permits communicating with vehicles, for instance for deactivating or immobilizing them at the request of the owner, the official authorities, an insurance company etc. or activating attention attracting means such as an alarm.

In the third place the method can be used for observing vehicles e.g. in toll traffic systems.

2. Discussion of Related Art

Several systems are available or will become available shortly for these purposes.

An overview of the systems is found in the following table 1 and can be divided in four different types as set forth after table 1.

localization parameters are sent to a service center. These systems are active or passive.

Active systems place a call to the service center when the vehicle is the subject of criminal intervention.

Passive systems rely on the owner of the vehicle calling the service center or a help desk.

The mode of the system is indicated by either a capital "A" or "P" in table 1.

The passive systems have the disadvantage that between the moment of criminal intervention and the placement of the call from the owner valuable time can get lost. In table 1 these systems are marked with the letter "L" in the Purpose column.

Such systems are described amongst others in FR 2,718, 532 and "Tracking en Tracing systemen speuren gestolen auto's op" from T. A. Koopmans, periodical "Preventie", January 1996, issue 149, The Netherlands.

3. Deactivation systems: these systems permit the owner of the vehicle once a theft is noticed, to deactivate his car by means of a telephone call. In table 1 these systems are marked with the letter "D" in the Purpose column.

4. Tall traffic systems: these systems allow automatic taxation of passing vehicles. In table 1 these systems are marked with the letter "T" in the Purpose column.

In the described localization systems, most of them make use of GPS satellites to do an exact localization and use the Global System for Mobile communications (GSM) to communicate this exact localization towards what can be called a service center. One disadvantage of this type of system involves reception of the GPS satellite signal. GPS signals

TABLE 1

Overview of Existing Localization and Signalization Systems

| Name | Purpose | Principle of Operation | Mode | When | Origin | Acc. (m) | Area of Oper. |
|---|---|---|---|---|---|---|---|
| CARANGEL | L | GPS + GSM/MTEX | A | Now | Netherlands | 25 | Europe |
| XC REFINDER | L | GPS + GSM | A | Now | Netherlands | 20 | Europe |
| QUICKTRACK | L | Ground system | A | ? | Australia | 50 | Netherlands |
| SPY | L | GPS + GSM/MTEX | A | ? | USA | 25 | Netherlands |
| MOBITRACER | L | GPS + GSM | A | 1996 | Netherlands | 25 | Netherlands |
| SATSTING | L | GPS + GSM/MTEX | A | Now | Canada | 25 | Canada |
| STARSYS | L | Satellite | A | 1997 | USA & France | >500 | worldwide |
| TRACKER | L | Ground system | P | Now | USA | 25–100 | (regional) |
| NUSAFE | L | GPS + GSM | A | 1996 | Germany | 25 | Europe |
| ALCATEL | L | GPS + GSM | A | ? | Germany | 100 | Europe |
| TRAKBAK | L | Ground system | A | 1996 | UK | 25 | Netherlands & UK |
| SATCON | L | Satellite | A | 1999 | Germany | 10–50 | worldwide |
| SKEYE | L | GPS + GSM | A | 1996 | Germany | 10–25 | Europe |
| CEL TRAK | L | GPS + ATF3 | A | 1996 | Ireland | 10–25 | Netherlands |
| NIGHTWATCH | L | Ground system | A | 1996 | UK | 10 | UK |
| CLOS | L | GPS + GSM | A | ? | Netherlands | 10–25 | Europe |
| SERPISPACE | L | GPS + GSM | A | 1996 | Italy | 10–25 | Europe |
| DETVOL | S | induction | P | 1997 | France | 15 | France |
| VOLBACK | S | induction | A | Now | France | — | France |
| FORD/MOTOROLA | D | Paging | P | 1997 | Belgium | — | Benelux |
| SPOOKY | D | Paging | P | 1996 | Belgium | — | Benelux |

1. Signalization systems: these systems can only signal that a vehicle with the module installed, has passed a certain beacon. The permanent localization of such a system is impossible. In table 1 these systems are marked with the letter "S" in the Purpose column.

2. Localization systems: these systems permit permanent localization of the vehicle in which the module is installed. Most of these systems have a data link over which the are high frequency signals and are very directional in nature. This causes signals to get lost in between higher buildings and constructions. Since they are satellite transmitted, the signals that reach the Earth's surface are very weak and can not penetrate any material.

The GPS satellites are owned and operated by the army of the United States of America. During times of crisis, the accuracy of the transmitted signals can be made much less than the normal accuracy. This to prevent "the enemy" from using one's own satellites.

Since the system is being used on a fairly regular basis in several civilian applications, there exist plans to turn the system into a subscribed system for which Europe has to pay a certain license fee to the USA, making future applications subject to financial consequences.

Despite the fact that the GSM network is more reliable and independent than the GPS system, it is not being used for localization in any of these systems. However, its accuracy is much less when no other localization parameters are available.

The price of most of the systems in table 1 is set mostly by the price of exploitation of the communication. Even with the current GPS situation in which reception is still free, the GSM communication can not be switched off but is in a permanent stand by status. Since its function can then be compared with a normal GSM mobile phone the subscription fee is the same.

Furthermore, any system that uses the GSM component in a continuous stand by or active state, will generate a lot of handover protocol overhead. Such systems are bound to fail when used in large volumes since the current GSM networks would become swamped with protocol communication blocking any other useful data traffic.

The systems that use proprietary data communication protocols like MOBITEX, ATF3 and the like all depend on the roaming agreements between the several network providers of these systems. These systems are mostly restricted to the national borders of those countries that are serviced by these operators.

Systems that make use of ground based infrastructure, like Tracker, Trakbak, Quicktrack and Nightwatch are inherently bound by the area that is covered by the infrastructure. Mostly, these systems operate on the principle that the signal of several transmitters is fed into a trigonometrical algorithm that results in localization. The most obvious disadvantages of these systems are that the area of operation is limited and that the infrastructure and the support and maintenance of the infrastructure is not very cost effective when operated over a large area for a single specific application.

Another observation that can be made about the above mentioned known systems and also about other systems as described in U.S. Pat. No. 4,651,157, U.S. Pat. No. 5,276,728, EP 87302967 and DE 43 04 094 as an example, is that none of these systems encrypts the communication. If these systems use a cellular communication network, the only encryption is done inside the protocol of this network. No additional privacy or safety precautions are taken.

The above mentioned systems are not aimed at integration with the multiplexed bus systems. The logical consequence of this is that the communication safety with other components in the vehicle is non existing.

U.S. Pat. No. 5,357,561 describes a method for communicating with an object in which two networks are used, the first one being a paging network and the second one a cellular mobile communication network. For several applications the use of only these two networks is not sufficiently reliable.

BRIEF SUMMARY OF THE INVENTION

The invention seeks to provide a method for communicating with or for observing and/or localizing objects which is safe, reliable and economic and especially can be used in different applications, as for example localizing stolen objects, and observing the presence of a vehicle in certain places, permitting for instance registration for paying tolls.

In accordance with the invention this object is accomplished in a method for communicating with an object, more particularly a vehicle, using a wide area paging network and a cellular mobile communication network, by coupling a module with at least a transmitter and a receiver to the object and using the module for communicating with in combination, at least three communication networks, the first one being said wide area paging network, the second one being said cellular mobile communication network and the third one being a local network using a spread spectrum modulation method.

For communicating or observing or localizing, a signal may be sent via the paging network to the module and a reply signal is automatically transmitted back via the cellular telephone network permitting observation and/or localization.

The above mentioned communication paging network is preferably the so-called ERMES (European Radio Message System) and the cellular network is preferably the GSM (Global System for Mobile communications) network. The spread spectrum network preferably is the CDMA (Code Division Multiple Acess") network. For each network or network system there is an interface available.

The wide area paging network is used for the bulk communication. The ERMES communication can be either very specific towards a single address or it can be virtually broadcast to several addresses at the same time.

The cellular telephone network is used for bidirectional data communication towards and from the object, particularly the vehicle.

The third network comprises a receiver which is used to receive data from a nearby beacon in a reliable way and a transmitter which is used to send data to a nearby receiver in a reliable way. The chipping codes of the transmitters of several systems, for instance belonging to several vehicles, are statistically different enough to enable a receiving beacon to recognize and differentiate the data coming from each receiver.

The combined use of different networks, each with a different modulation and transmission technique, allows a broad range of communication possibilities with for example vehicles and that for a broad range of applications.

The invention also concerns a module to be used by the method according to the invention and to be mounted on the object to communicate with or, observe, or localize the object. This module comprises interfaces with said three networks.

The invention will now be described by way of example and with reference to the accompanying drawings in which:

BRIEF DESCRIPTION OF THE DRAWINGS

FIG. 4 represents schematically a system used for performing a method for communicating with an object using two networks;

DETAILED DESCRIPTION OF THE PREFERRED EMBODIMENTS

Figure 1:
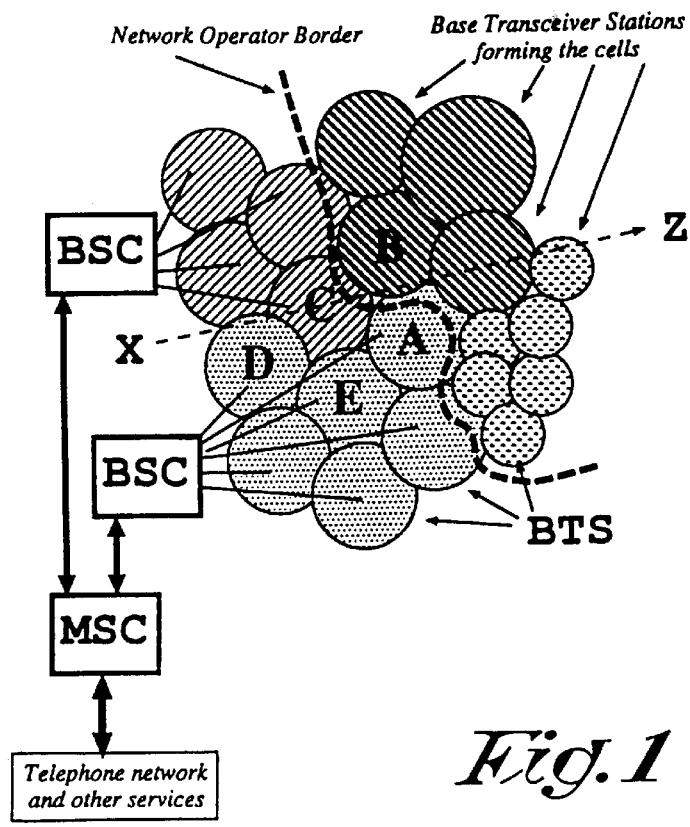
FIG. 1 shows a known GSM (Global System for Mobile communications) cellular network structure.

The preferred method for communicating with and/or observing and/or localizing objects according to the invention involves mounting, a module, more especially a receiver-transmitter module, on the object, and using the module to communicate with three different networks, each having preferably a different modulation and transmission technique.

A first network is a so-called wide area paging network, preferably the European Radio Message System, called ERMES.

A second network is a cellular telephone network, preferably the Global System for Mobile communications system, called the GSM network.

First, in order to better understand the invention, a system is described which uses only these two networks.

The European Radio Message System, called ERMES, is a wide area paging standard that was developed during the late 1980's and is established as a standard by the European Telecommunications Standardization Institute (ETSI). Recently, it has been adopted as a global standard by the International Telecommunications Union. Since ERMES is a comprehensive standard that defines all interfaces with the network, it is possible to mix the components of several vendors. This will help ensure the competition between vendors and make the network very cost effective.

Currently, ERMES networks are in operation in France, Germany, Finland and the Netherlands; most European paging operators plan to introduce ERMES paging services this year. Currently, one vendor, Ericsson is delivering equipment to network operators.

ERMES is a so called second generation paging network. It is a replacement for the older POCSAG systems that are currently in use. ERMES is aimed at relieving the current bandwidth bottleneck while allowing international roaming between countries. With current POCSAG networks, this roaming is not ensured, making a national pager useless in other European countries.

ERMES operates at a rate of 6250 bits per second and can use 16 channels. All receiver units can listen to traffic sent out on any of the 16 channels. The specific channel allocation between base stations makes roaming possible; adjacent base stations that do not belong to the same network will use a different set of channels. A receiver, placed in between these two base stations will listen to both.

Current empirical data shows that the POCSAG standard is able to support 180,000 subscribers on its single channel, while ERMES is designed to handle more then 500,000 subscribers on any of its 16 channels. This is based on the assumption that the message equals 10 characters. The figures change to 36000 POCSAG subscribers and 160000 ERMES subscribers for a message of 40 characters.

In contrast to the POCSAG paging network that operates in the neighborhood of 448 MHz, the frequency band for ERMES is fixed at 169 MHz to make it a standard. The lower frequency that is used for ERMES paging has the advantage that the signal travels in a less directed way (more omnidirectional) so that antenna direction does not influence the reception quality.

Also, the signal is less susceptible to multi-path or ghost images that arrive at the receiver, again making the reception more robust. The ERMES signal that arrives at the receiver can be monitored for its field strength. This information can again be correlated with a certain distance from the base station. Together with the timing parameters in GSM that are also correlated with a distance from the GSM base station, the field strength information forms the backbone of the correct localization of an module and thus achieve the object of the invention. More information on the GSM frame timing parameters is given hereafter.

The ERMES standard is prepared to support very long messages up to 64 K Bytes and to provide transparent transfer of data, thereby providing the opportunity for new applications like the present invention to be developed.

The invention can fill a very specific niche in the automotive telecommunications business that is just starting to appear. The use of the GSM network in the invention is one of its strongest features, as will become clear in the next sections.

The GSM system was designed to meet the following criteria:

Low terminal and service cost

Support for international roaming

Spectral efficiency

ISDN compatibility for data communications

Support for a new range of facilities and services

The first goal is achieved again by developing a vendor neutral standard as in the case for the ERMES network. Since all equipment interfaces are fully defined, all vendor equipment can be mixed; hence competition drives down the prices.

The second and third citeria are achieved by using a cellular structure and assigning each cell its own channels. The general situation of two different GSM networks is shown in FIG. 1. This figure shows the following components: The base transceiver stations, the base station controllers and the mobile services switching center.

The base transceiver stations, called BTS, form the different cells of the network. They consist of a transmitter and receiver combination and work over a predefined set of frequency bands out of a total of 125 bands. All adjacent cells work on a different set of frequency channels so that there is no channel interference between these cells. This enables the reuse of the frequency bands in cells that do not overlap; hence the spectral efficiency.

Since the BTS's are relatively simple units, a group of BTS's is controlled by a base station controller called BSC. By combining several BTS's in one logical unit, the protocol overhead that is induced by a mobile terminal equipment, like for instance a GSM telephone, can be reduced. Most of the handover information is handled by the base station controller without contacting the Mobile services switching center, called MSC. The handover is the procedure used when the mobile equipment is leaving one base station covered area and traveling into another area.

The MSC controls all base station controllers in its own network. I.e. in each different network, there is only one MSC. The MSC handles the upper layers of the protocol. When a mobile terminal travels from one network to another, for instance from cell A to cell B, referring to FIG. 1, it will be the MSC's of both networks that arrange the handover. Also accounting information is being exchanged for billing the communication cost.

It is this "layering" of responsibility that make the GSM network the most flexible mobile communications network.

One of the disadvantages however of this layering principle is that there can exist a lot of protocol overhead. If for instance, referring to FIG. 1, a mobile terminal equipment is traveling from point X to point Z, but is logged on to the network, it will generate a protocol data stream ultimately resulting in a handover between the two MSC's, even when the terminal is not being used. This all happens transparently for the user.

The GSM standard specifies the frequency bands of 890 MHz for the uplink data stream that originates from the mobile unit towards the base station. The band from 935 MHz up to 960 MHz is used for the downlink from base station towards mobile station. Each of these bands is further divided into smaller frequency bands each of 200 kHz width. To achieve spectral efficiency, this finite set of frequency bands is reused, referring to FIG. 1, so that the base station B will have a different set of frequencies than base station A or C. Base station D or E, however, can operate on the same set of frequency slots as cell B theoretically. In practice, the reuse of frequencies is not done with only a single interspersed cell that uses another frequency set.

The finite number of available frequencies is allocated on a national basis to a number of network operators. In each country, the maximum number of concurrent network operators is therefore fixed.

Figure 2:
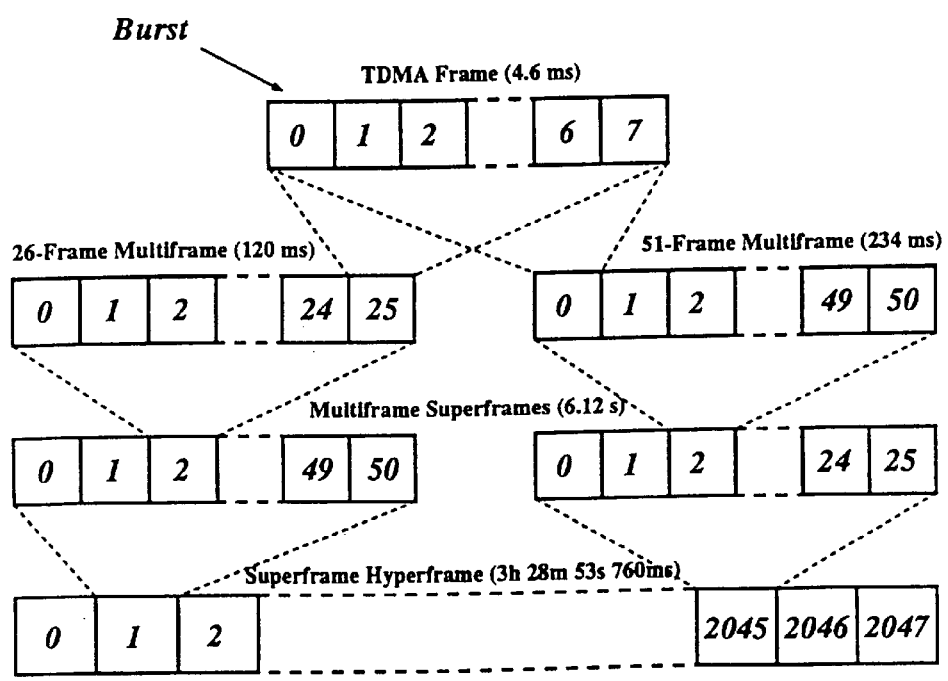
FIG. 2 shows a known TDMA (Time Division Multiple Access) and frame organization of a 200 kMz channel.

To further increase the spectral efficiency, each of the 200 kHz frequency bands is divided further in so called time slots, the fundamental unit of which is called a burst. The fundamental unit or burst has a length of 577 microseconds. A set of 8 of these bursts is grouped in what is called a TDMA frame. The organization of timeslots and frames is depicted in FIG. 2. TDMA stands for Time Division Multiple Access. It is a technique in which each transmitter is actively sending only a small portion of the time, during its own slot. As a result all transmitters cooperating, are sharing the time that is available on a certain frequency, thereby virtually increasing the available bandwidth.

The TDMA frames are further combined in sets of 51 frames or 26 frames, in a multiframe structure. The total time in such a 26-frames multiframe structure is 120 milliseconds while it is 234 milliseconds in the 51-frame multiframe.

Both multiframe structures are further combined in a superframe that lasts 6.12 seconds. So 26×51-multiframes and 51×26-multiframes are combined into a superframe. To make the picture complete, 2048 of these superframes are combined into a hyperframe that lasts a total time of 3 hours 28 minutes 53 seconds and 760 milliseconds after which the systems restarts with sequence number 0. During such a hyperframe, every TDMA frame gets assigned a unique 22 bit sequence number that makes it possible to uniquely identify a certain TDMA frame among the 21725184 possible TDMA frames.

Figure 3:
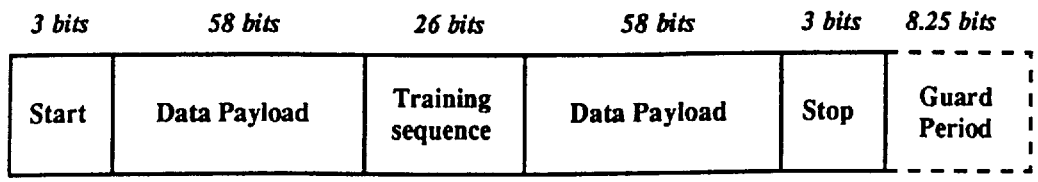
FIG. 3 shows a known structure of a normal burst.

The structure of a single normal burst is shown in FIG. 3. This normal burst consists of a total of 156.25 bits, that fall into four categories:

1. The start and stop sequences that span 3 bits and signal the beginning and the end of a burst.
2. The data payload portions that carry the useful data that needs to be transmitted. The total span of both is 116 bits.
3. The training sequence that is placed in between both data payload portions. In the GSM frequency range, there exists an unfortunate phenomenon, called multi-path signals in which the main signal, traveling from base station towards mobile equipment, is polluted with reflections or ghost images of itself, but different in phase. These ghost images come from the fact that the main signal is reflected by buildings and other physical objects. The training sequence is used to train or to teach an adaptable filter to reject these ghost images from the received signal.
4. The guard period forms a sort of time spacer in between bursts to accommodate a slight offset in the timing parameters. It is there to make sure that slightly unsynchronized bursts do not collide with each other.

It is important to notice, that this highly complex frame structure is based on perfect timing and, requires a very good synchronization. All traffic that is received at a base station, from various mobile terminals that are actively transmitting or in a handover situation, needs to be synchronized in such a way that the base station can pick the correct burst out of the frames that reach its antennae.

This requires that each mobile terminal station starts the transmission in a precisely timed way; i.e. a mobile equipment terminal that is 15000 meters away from a base station should begin transmitting 49 microseconds earlier than a mobile terminal that is only 300 meters away from the base station. Since radio waves travel at the speed of light, one can roughly equate 300 meters with a delay of about 1 microsecond.

The delay or timing parameters that are used during a transmission by the mobile terminal can thus be used to correlate back towards a distance from the base station with which it is communicating. This feature combined with the inherent data transmission capabilities of the GSM network form one of the backbones of the method according to the invention.

In its most simple form a system can be provided which makes use of two communication networks, such as a paging network 1, particularly the above described network and a cellular telephone network 2, particularly the above described GSM network.

As shown in FIG. 4, the cellular telephone network 2 comprises a number of ground stations 3 which can receive signals 4 and transmit signals 5. The network 2 can be divided into cells, each having an action radius 6 smaller than the action radius 7 of the ground stations 8 of the paging network 1 transmitting signals 9.

The cellular network 2 is coupled to the classic telephone network 10.

In the object 11, e.g. a car, a module 12 is built-in, comprising a receiver 13 which can be reached over the paging network 3 and a transmitter 14 which can communicate over the network 2 and the telephone network 10 with a service center 15.

This center 15 comprises means 16, for instance a computer, for producing, coding and cryptographically transforming the signals 9 and 10.

Code keys are used which are only known by the service center. Preferably a so-called public-key system is used for the authentication and cryptographic transforming of the information.

When the owner of the object 11 finds out that it has disappeared, he informs the service center 15, which transmits a coded, encrypted signal 9 over the paging network 1. All modules 12 which are in use, even on objects which are in an underground garage, receive this signal 9 and decode it.

The module 12 in the stolen object 11 recognizes the code and instruction is given to the transmitter 14 to communicate with the service center 15 via the network 2 and to transmit information permitting the source center to localize the stolen object.

This protocol may be repeated several times at certain intervals until connection with the service center 15 is made.

The connection via the network 2 can be very short, e.g. limited to the so-called "hand-shake protocol".

The information comprised in the signal 4 transmitted by the module 12 may concern only the identification of the object while the localization is performed from the receiving information of the network 2. Depending on the ground station 3 receiving the signal 4, the action radius 6 wherein the object 11 is present is known. From the strength of the signal 4 the distance to the corresponding ground station 3 can be deduced.

The signal 4 is normally received by several ground stations 3 and the exact location may be calculated by trigonometry.

It is also possible that the signal 4 is already representative of the location, e.g. giving the location or data permitting calculation of the location e.g. by the means 16.

In this case the module 12 has to include the means to obtain such information, such as detection and calculating means for determining the strength of the received signal 9, or the strength of one or more signals 5, or the strength of both.

From this information, the location may be determined by trigonometric calculation in the module 12 or in the service center 15 or in a cooperating unit.

The object 11, more especially a vehicle, can be provided with means which calls attention to the vehicle such as a light or a sound source, or with means immobilizing the vehicle.

The means may be coupled to the module 12 and activated via a recognizable signal 9. Two such means may be activated one after the other, for instance a silent means such as a light and later a means producing a sound.

In another, somewhat different embodiment, only the possibility for transmitting signals to the object 11 is provided, but not the possibility to receive back signals, whereby the transmitted signals are then exclusively used to activate one or more of the means for calling attention to the vehicle.

If an owner notices that his object, for instance his vehicle, has been stolen, he contacts the service center 15, for example by phoning from a public cell, after which the service center 15 transmits a coded signal 9 to the module 12 mounted on the object, causing the activation of the attention calling means or means that deactivates the vehicle wherein the module 12 is mounted.

If a driving vehicle is deactivated, this may be done in such way that this deactivation is not dangerous to traffic, and the vehicle may for instance be slowed down progressively.

The above-mentioned embodiments may be combined and for instance signals 4 may be sent back over the cellular network 2.

If the object 11 is a vehicle, the module 12 will preferably be hidden in the coach-work. The module 12 can be provided with a security system for assuring that the service center 15 is automatically informed when someone tries to break in the module 12 or to destroy it.

The term "module" has to be interpreted in a large sense and does not mean that its components are necessarily mounted in a same compact housing, although this is preferred. The module may also be incoporated in a microchip.

According to the present invention, in addition to networks 1 and 2, the method uses a third network 17, for example a local network using a spread spectrum modulation method.

This third network 17 is preferably the CDMA technique, which is similar in goal to the above described TDMA technique.

CDMA is a specific implementation of a more general technique called spread spectrum.

Spread spectrum is a digital coding technique in which the signal is transformed or spread out so that is appears more like noise. The coding operation increases the number of bits transmitted and expands the bandwidth that is used. Noise has a flat, uniform spectrum with no coherent peaks and can generally be removed by filtering. The spread signal has a much lower power density, but the same total power.

This lower power density, spread over the expanded transmission bandwidth, provides resistance to jamming, interference, multi-path fading and unwanted interception.

Figure 5:
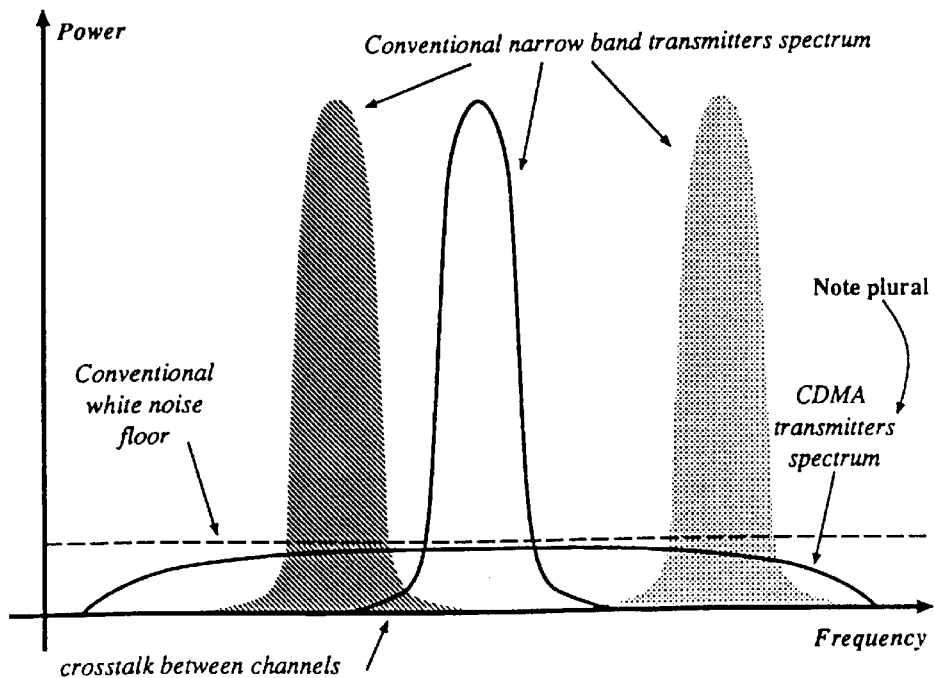
FIG. 5 shows the difference between a conventional and a spread centrum (known Code Division multiple Access technique)

FIG. 5 shows the difference between conventional transmitter systems and a spread spectrum transmitter system. The spread spectrum does not suffer from crosstalk between frequency bands and the transmitted power of a spread spectrum system can be kept below the conventional noise power floor.

Conventional non spread spectrum systems transmit and receive on a specific frequency band that is just wide enough to pass the information. By assigning different users different frequency bands and restricting the power that modulates the signals, undesirable crosstalk and interference is kept to a minimum.

The main advantage of spread spectrum systems and CDMA systems in particular, is that, despite the electromagnetic interference, the signal can be manipulated to propagate fairly well, even in very noisy environments, like in a moving vehicle. In spread spectrum modulation, a signal's power is spread over a larger band of frequencies. This results in a more robust signal that is less susceptible to electrical noise and interference from other transmitters.

In a CDMA spread spectrum system, the original data that is to be sent, is spread by means of a spreading code. I.e. each bit is chipped into a pseudo noise sequence of bits. The resulting bit stream is then sent by the transmitter over a very wide frequency band. The rationale behind this technique is that a spread spectrum signal with a unique spreading code cannot create the exact spectral characteristics as another spread coded signal. Using the same code as the transmitter, the receiver can correlate and collapse the spread signal back down to the original form, while other receivers using different codes cannot.

This feature of spread spectrum makes it possible to build and operate multiple networks in the same location. By assigning each one its own unique spreading code, all networks can use the same frequency band, yet remain independent. The transmissions of one network appear to the other as random noise and can be filtered out because the spreading codes do not match.

The telematica method according to the invention aims towards a single application. Its purpose is to serve as a general platform for any communications needs. The combination of the three different networks and modulation techniques, illustrates the strength and broad application base that exists for this kind of system:

Transmission of very local traffic information through local CDMA transmitter beacons.

Transmission of nation wide traffic information through the wide area paging network ERMES.

Transmission of pan European messages through the ERMES network.

Toll information that is distributed through local CDMA beacons.

Messages to very specific automobiles about technical control issues e.g. yearly checkup of the condition of the automobile.

Fleet control information.

Transmission of area information that can alter the regime of the engine in for instance a city traffic environment.

Immobilization of a vehicle by police forces or at the demand of insurance companies is also possible, but this does not always require the combined use of all three networks.

Figure 6:
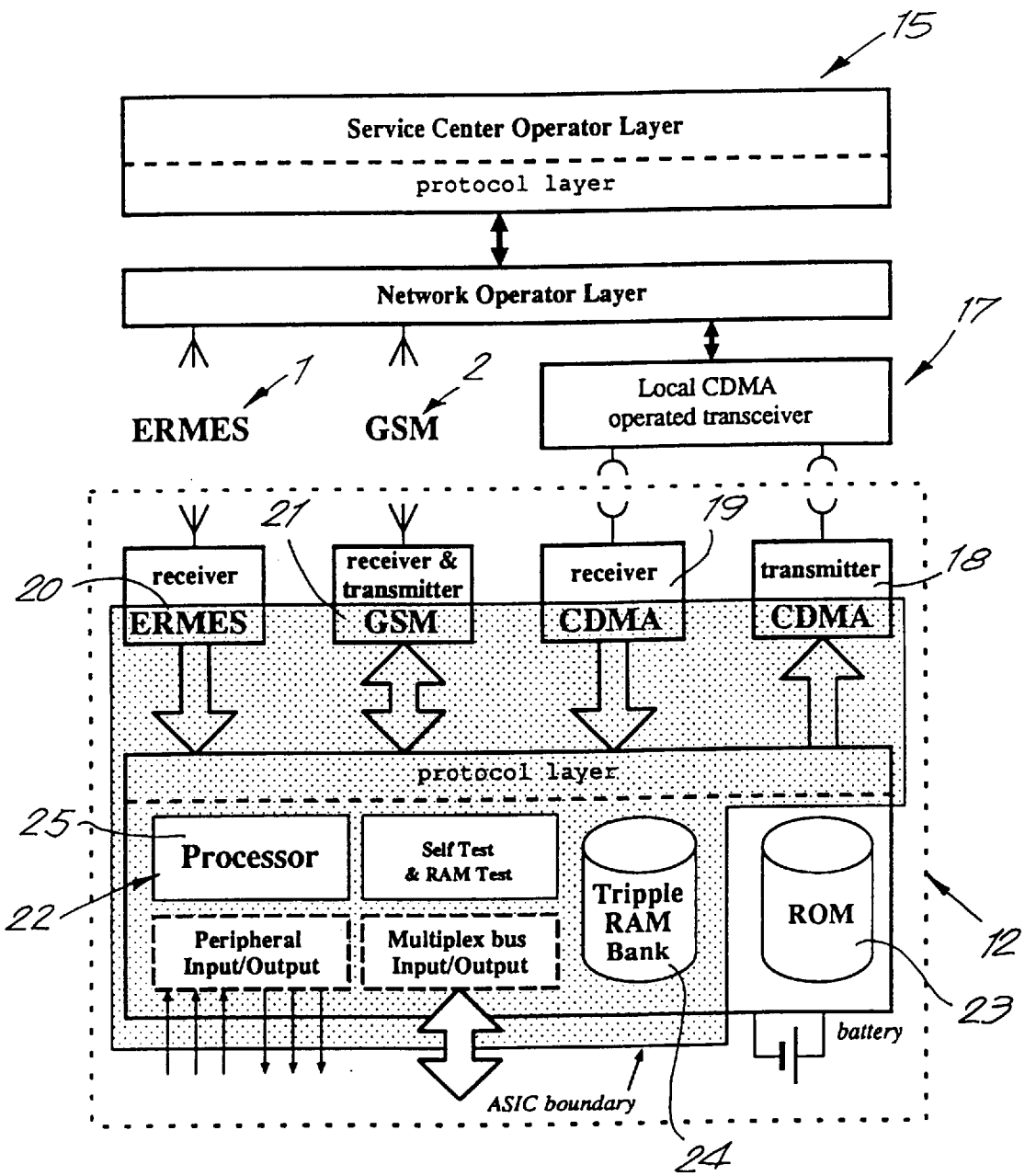
FIG. 6 shows schematically a block diagram of the complete system used in a preferred embodiment of the method according to the invention.

In FIG. 6 the overall view of the telematica system for applying the method of the invention starting from the service center down to the receiving module in the vehicle is represented.

The method uses a system built out of the following components:

The service center 15 from which all activity is monitored and initiated.

The wide area paging network 1 ERMES and the cellular GSM network 2 as it is exploited by a network operator.

A third network 17 formed by local sending and receiving beacons, operating by means of the CDMA spread spectrum technique.

A module 12, located in the vehicle, that interprets all the data received over any of the three reception circuits. The details of this part are described hereafter.

The responsibility of the service center 15 can be categorized in two main objectives:

1. It will form the interface between the network operator. As such, it will interpret all incoming and outgoing data. This is the technical interface.
2. It will form the high level application interface to the different user groups and organizations or customers of the method. This is what can be called the customer interface.

The technical interface of the service center 15 is responsible for coordinating the data stream that is generated over the three communication networks 1, 2 and 17. This data stream is subject to a generic protocol that offers both flexibility towards application and is safe; i.e. the protocol offers genericity, encryption, decryption and authentication.

Figure 7:
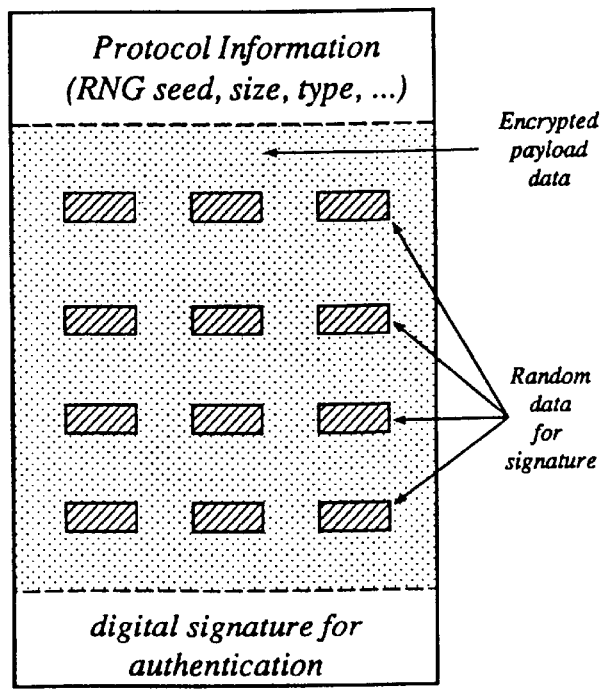
FIG. 7 shows a standardized container for generic data.

It is clear that for an error free and safe transmission, a generic protocol needs to be conceived. Beside the fact that the protocol will define a standardized container for generic data, as shown in FIG. 7, it will perform two major tasks:

As a first task, the protocol will encrypt and authenticate any outgoing data. The authentication can be performed by means of a public and private key algorithm of which the private key is in the possession of the service center and the public key is contained in the Read Only Memory (ROM) portion of the receiving module. The container, as shown in FIG. 7, carries a seed number for the random number generator in the module. The outcome of the random number generator is the key with which the data can be decrypted. When the decryption is performed, the authentication of the data can proceed by means of the public key that is contained in the ROM of the module. This situation is described in FIG. 8.

Figure 8:
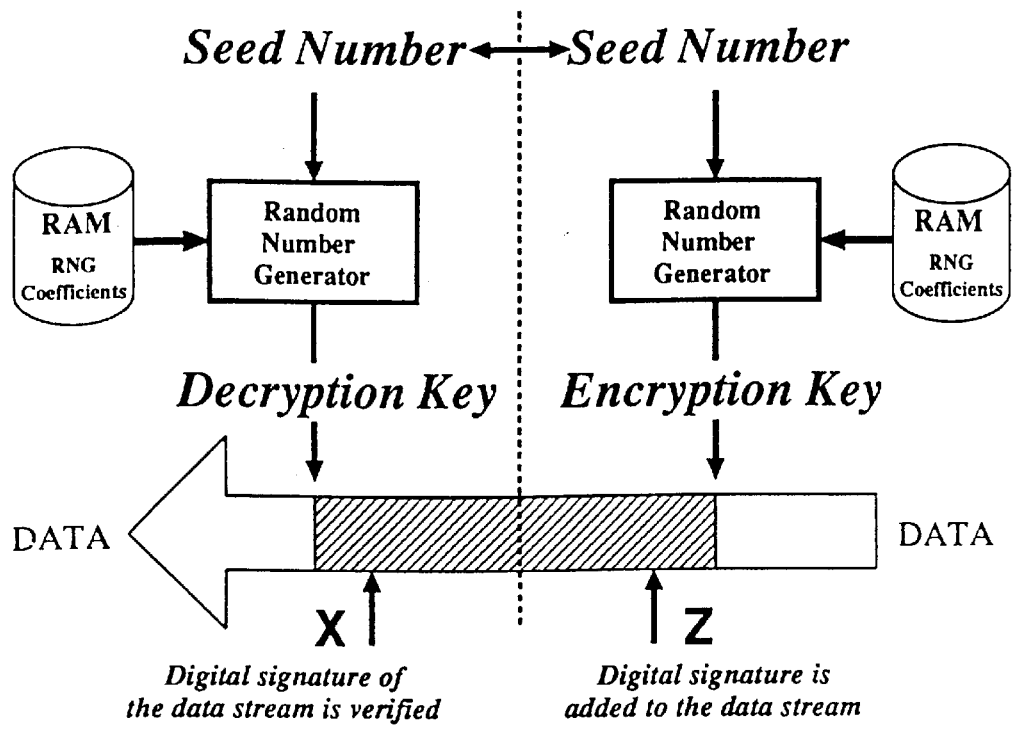
FIG. 8 illustrates the encryption process from the service center to the module of FIG. 7.

FIG. 8 shows the following components, both on the module 12 side as on the service center 15 side:

The random number generators (RNG's) which are initialized with a seed number that is transmitted as clear text (unencrypted) from the service center to the module.

The coefficients for these RNG's which are stored in volatile Random Access Memory (RAM). By using volatile RAM, the system can be made such that the RAM contents are destroyed when a criminal intervention is taking place.

Since on both the service center side and on the module side, the same random seed and RNG coefficients are being used, the data that is encrypted at the service center can be decrypted again in the module. Since volatile RNG coefficients are used, these can be changed when necessary by the service center. The new RNG coefficients can be sent encrypted to the module and can take effect when decrypted and authenticated.

To guarantee the uniqueness of the datapacket and hence the uniqueness of the digital signature, the contained data is interspersed with randomly set bits, as is shown in FIG. 7.

Figure 9:
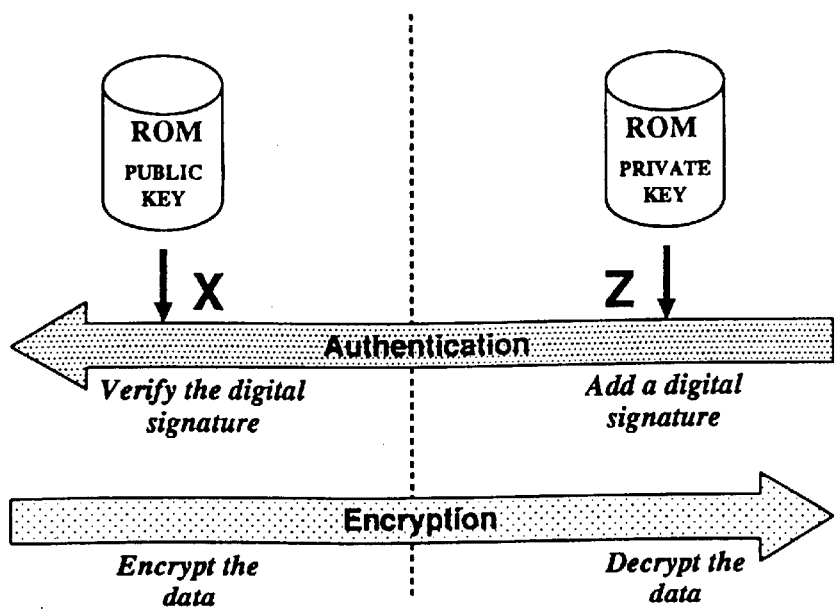
FIG. 9 illustrates the encryption process of FIG. 8 in greater detail.

The data stream from the service center 15 to the module 12 is digitally signed in the center and verified for authentication in the module 12. This process is shown between the two points marked with a "Z" and an "X" in FIG. 8. The right side of the air time interface (dotted line) represents the service center 15, the left side the module 12. In FIG. 9 the situation is explained in more detail, together with the encryption that is taking place when data is sent from the module 12 to the center 15.

The encryption and authentication described in FIG. 9 is based on a so called public key system. This means that there exists two different keys which are associated with each other, a public key and a private key. When the direction of the data stream is from service center to the module, the data can be signed by means of the private key, i.e. a digital signature consisting of 128 bits is added to the data packet that is shown in FIG. 7. The correctness of this signature can be validated only with the public key from the module 12. It is impossible to create a digital signature with the public key. The public key can only do a verification. Forgery of a signature is therefore virtually impossible. Since we can only do an authentication of the data, the encryption system described in FIG. 8 is added on top of the authentication.

When the direction of the data stream is from module 12 towards the service center 15, the data that is to be sent can be encrypted by means of the public key. The decryption can only be performed by means of the private key from the service center 15. A public key can never be used to decrypt a message.

Since the authentication is performed by means of a public key algorithm, there is no problem when the key portion, contained in the ROM of the module is ever compromized. This key can be publicly known to everyone; it can not be used to forge any signature or to decrypt a message.

As second task, the protocol will decrypt incoming data. In the case that data is being received by the service center 15, the data payload is encrypted by means of the public key in the module 12. This guarantees that any sensitive data that is sent back to the service center 15 will only be readable by the service center 15.

As mentioned herebefore, the service center 12 will be responsible for the coordination between the data that is generated by the three different network interfaces. The CDMA data is being transported to the service center 12 over either a fixed link or over the GSM network. Logically speaking however, there are three different data streams for the service center to monitor.

Each different network type 1, 2 and 17 performs a very specific task in a method of the invention.

The ERMES paging network is especially suited to transport large blocks of data, up to 65 K Byte blocks. Therefore is used for bulk transport to the module. ERMES can address a very specific module but can also be used to "broadcast" data so that all modules receive the same message.

A paging network is more robust in transmitting data. A single base station can cover a much broader area then for instance a GSM base station. The reception of a paging signal through concrete walls e.g. parking lots, is much better than for the rather fragile GSM signal.

A paging receiver, does not cause any protocol overhead even when it is in standby mode, listening to messages. It therefore does not consume any bandwidth, which has its repercussions on the price of exploitation. Compared to a GSM terminal, the cost is very small.

So for both price and reliability reasons the downlink connection to the module will be done via the ERMES paging network.

The GSM network has two very specific purposes: it provides the data uplink from module 12 to the service center 15 and it provides the service center 15 with parameters that will allow a localization of the module 12.

The local CDMA network 17 or beacons provide a robust communication channel for short messages. The main purpose of CDMA based beacons is to communicate toll information to all modules that pass nearby. The CDMA transmissions towards the modules always operate in "broadcast" mode. In the module 12, there is also a CDMA based transmitter 18, that can send messages to a nearby beacon. For this transmission to succeed, even in the possible presence of several other modules transmitting their information to the same beacon, each module should use a different binary key so that the receiving beacon can distinguish each transmitter.

The CDMA based transmitters 18 and receivers 19 communicate with the service center 15 possibly over a GSM link or a fixed link, according to the infrastructure at hand. For fixed CDMA transmitter and receiver combinations, it is best to use a fixed link over the existing signaling infrastructure. For mobile CDMA transmitter stations, as used in temporary situations, a GSM based link is most suited. The coordination between these CDMA transmitter and receiver combinations and the GSM network 2 is also performed by the service center 15.

Since from a network operator point of view, the ERMES and GSM networks are completely separated, there is a need to coordinate the traffic over both networks. For instance, when a certain data packet is sent to the module over the ERMES paging network and when this specific packet requires the module to send data back, the data that is combing back over the GSM network needs to be monitored for this specific confirmation message. If such a message is not received within a certain period, either the reception at module failed or the module is unable to transmit the confirmation.

In either case, the data needs to be resent by the service center 15 to the module 12 up to the point where a confirmation message is received over the GSM network. If such a confirmation message is not received even after a certain number of retransmissions, the module can be assumed to be faulty and the owner of the car can be contacted to check out the situation.

The same method of repeated attempts to retransmit a data packet is being used at the module side.

The combined result of this coordinated retransmission protocol is a high communication reliability even in the presence of insufficient coverage of either the ERMES or the GSM network.

Any data that is being transmitted and received by the service center 15 will be logged for possible future reference.

In case that a localization of a module 12 is required, the service center 15 will correlate the different parameters and perform the localization as accurately as possible. The following parameters for a localization are available:

- the TDMA frame timing parameters of the GSM network in the module,
- the identity and the field strength of the ERMES base station at the module 12. For this purpose a database that relates the identity and field strength with a global position, has to be set up,
- the correlation between both above parameters and an electronic version of a road map, describing the situation in the neighborhood of the GSM base station involved,
- the trend of change of the first three parameters described.

The telematica module 12 according to the invention, as it is shown in FIG. 6 comprises the following blocks:

- An ERMES interface 20 that receives packets of data from over the wide area paging network 1.
- A GSM interface 21 that is capable of both sending and receiving digital data. The interface does not contain any speech encoding or decoding circuits.
- A CDMA interface 19 capable of receiving information that is broadcast in a very local area, e.g. toll information.
- A CDMA interface 18 capable of sending information back to a receiver located nearby the vehicle at the moment of transmission.
- A system that combines and controls all these interfaces by means of software and hardware, the control module 22 comprising a processor. This control module 22 also forms the peripheral interface with the vehicle, the read only memory 23 and the data storage memory 24. It can be subdivided in several sub parts, as will be illustrated in later.

From the FIG. 6 it is clear that four different RF or radio frequency interfaces can be distinguished. It is clear that the electro magnetic compatibility between all four interfaces will form a complex design problem that needs to be solved during the engineering of the module 12.

During normal operation, the most problematic RF interface is the one that concerns protocol overhead and electromagnetic fragility. This is addressed by switching off the GSM circuits to ensure that during standby operation, there will be no RF interference or electromagnetic compatibility problems caused by the GSM RF circuit. Furthermore it will guarantee the absolute privacy of the object 11 or vehicle during normal conditions. There is no tracking possible when the GSM system is switched off.

Second, it will guarantee that there is no protocol overhead or handover overhead caused by a module 12 of the invention that travels through GSM base station cells. In fact, the activation of the GSM circuits is under control of either the service center 15 or the software contained in the module 12. Since this software is also controlled by the service center, the ultimate responsibility of the GSM activity is under complete supervision of the control center.

Should the GSM circuits be activated for data transmission or for localization purposes, the ERMES RF interface will first be switched off before the GSM circuits are switched on to attempt the transmission. Again, this procedure under control of the software in the module 12 will ensure the least problems regarding electro magnetic compatibility.

The CDMA network 17 or technique has already been described as being very resistant to jamming by conventional radio transmitter systems. Current plans are to preliminarily operate the CDMA links over a 2.4 GHz radio link and as such the interference problem with lower frequencies will be small.

The main purpose of the control module 22 is to glue together the different network interfaces and to form the peripheral interface with the signals as they are used in the vehicle itself. Its functions can be summed up as follows:

It forms the logical interface with the protocol layer of the service center 15.

It will execute the program contained in the ROM 23 and RAM 24 part of the module 12 and act according to the received commands and data. It is during the execution of this program that the module 22 will eventually communicate with the object 11 or vehicle.

It will control the power on and off cycles of the different network interface circuits according to the commands received and the contained software program to reduce interference problems as much as possible.

The first logical part of the control module 22 is the interface with the protocol as it is used in the service center 15. When data is received from the service center over any of the three receiving network interfaces 18–19, 20 and 21, it is first necessary to check the digital signature of the received packet and if that proves to be authentic, the data needs to be decrypted, as was already shown in FIG. 8.

When data is being sent to the service center 15 over either the GSM link or over the CDMA transmitter link, the data is first encrypted with the public key contained in the ROM 23 of the module 12, prior to being submitted to the interface. All of the above functions need to be performed in hardware by means of the protocol interface.

The processor 25 including in the control module 22 will control the complete module 12 and network interfaces, based upon the software that is contained for the most part in the ROM 23 and partly in the RAM 24. The RAM portion of the software can be updated if needed by means of one of the receiving network interfaces. This will allow a flexible environment in which part of the functionality of the module 12 can be changed during operation.

The RAM 24 that is being used to store a part of the software is divided into three redundant areas. This will eliminate the possibility of soft and hard faults in in the RAM due to heavy particle impact, electro migration, breakdown, etc. The custom hardware in the module 12 will check the consistency of the data in the three different RAM areas and will signal any malfunction back to the service center 15, if possible.

To control any errors in the processor 25 itself, a suitable built-in self test software function is run periodically and will report any errors back to the service center 15 if possible. Even when reporting this situation back is impossible, the module 12 will disable itself for any further reception of critical commands.

The functionality of the embedded software and the ability to download new software parts on the fly, will create new possibilities for upgrading the module 12 and offering extra services.

The control module 22 also forms the interface with the electrical systems of the vehicle it is built-in. This peripheral interface presents itself in two forms:

1. The digital input and output over the multiplexed bus.
2. Analog input and output signals for which the digital equivalent signal is not available on the multiplexed bus.

Nowadays, there is a trend in the automotive industry to standardize around a common protocol and hardware system to convey signals in a vehicle, called a multiplexed bus. This bus will enable greater compatibility between electrical products for vehicles and will create a big reduction in the amount of wiring. The first advantage of the uniform bus structure for this application is that engineering effort to create the interface needs not to be repeated for every make of car.

The second advantage of the multiplexed bus is that in cooperation with the car manufacturers a protocol can be conceived that will make it virtually impossible to remove the module 12 from the car. The central processing unit that controls the complete car can poll the telecommunications module for its presence and eventually deactivate the car in a safe way, when such module is absent. To prevent criminal intervention during this communication between the car's central processing unit and the telecommunications module 12, the exact data can again be encrypted by means of a temporary key, exchanged between the module 12 and the central processing unit.

This key exchange can be made completely safe by means of a public key algorithm as described in "The First Ten Years of Public-Key Cryptography, Diffie, Whitfield, Proceedings of the IEEE 76.(1988) pages 560–576. The main characteristic of this algorithm is that the communication between both modules may be monitored and intercepted, and yet it is impossible with this knowledge to decrypt the communication. The system does not rely on any secret information or hardware in any of the two modules, making this algorithm very well suited for this application. For this technique to be integrated in both systems, a close cooperation between car manufacturers and the telematica module engineers is required.

While the multiplexed bus is the most important issue in interfacing with the vehicle, there probably remain specific input output requirements that can not be dealt with by means of the multiplexed bus. For these cases, the general input and output ports form an alternative. These ports can close and open contacts and can sense the state of transducers. Their specific use is customized for a specific model of a vehicle.

The method of the invention uses existing pan European networks with the guarantee that it can provide a European coverage of its services.

The method of the invention uses existing and standardized infrastructure which makes it an inherently more cost effective approach. When new infrastructure is required, like the CDMA transceiver beacons, the cost of this infrastructure is very small compared to the revenue that is generated with these beacons, i.e. the toll. However, the CDMA transceiver beacons are not limited to this toll application.

The communication in the vehicle itself is completely secured by a Diffie-Hellman key exchange algorithm as disclosed in the above-mentioned publication "The First Ten Years of Public-Key Cryptography".

Probably the most important difference between the method of the invention and the prior art methods, is that the method of the invention is not bound by a single application. The complete system is built around the concept of safe communication that is safe and secure, reliable, and cost effective.

This feature makes the invention stand out above all other systems since it provides a flexible platform for a whole slew of telematica applications.

The connection via the telephone network 2 is not permanent, so that this network is not overloaded.

Localization is very simple and accurate.

What is claimed is:

1. A method for communicating with an object, comprising the steps of coupling a module with at least a transmitter and a receiver to the object, said module being one of a plurality of modules arranged to communicate with at least three communications networks, a first network being a wide area paging network with which the module selectively communicates, a second network being a cellular mobile communication network with which the module selectively communicates and a third network being a local network which uses a local beacon to communicate with all modules of said plurality of modules that pass nearby using a spread spectrum modulation method.

2. The method according to claim 1, further comprising the steps of sending a signal over one of the three networks to the module and automatically transmitting a reply signal back over one of the three networks.

3. The method according to claim 2, further comprising the steps of sending a signal over the paging network to the module and causing the module to automatically transmit a reply signal back over the cellular mobile communications network the cellular mobile communication network being switched off during stand-by operation to guarantee privacy of the vehicle during the stand-by operation.

4. The method according to claim 2, further comprising the steps of causing the module to transmit back the reply signal and using the reply signal for identification of the object.

5. The method according to claim 1, wherein the communication paging network is the European Radio Message System (ERMES).

6. The method according to claim 1, wherein the cellular mobile communications network is the Global System for Mobile (GSM) communications network.

7. A method according to claim 1, wherein said object is a vehicle, and further comprising the steps of using the wide area paging network for large volume communications and using the cellular mobile communications network for bidirectional data communication towards and from the vehicle.

8. The method according to claim 1, wherein the third network is a Code Division Multiple Access (CDMA) network.

9. A method according to claim 1, further comprising the step of using a third network which comprises a receiver used to receive data from a nearby said local beacon and a transmitter used to send data to a nearby receiver, whereby spreading codes of transmitters of several modules are different to enable a receiving beacon to recognize and differentiate data coming from each receiver that is a member of the population of receivers in a vicinity of the beacon.

10. The method according to claim 1, wherein the communication is used for the localization of a module.

11. The method according to claim 10, wherein information used to correlate towards a localization of a module includes:

timing information inherent to a cellular mobile communications network protocol which is available to the module and which is sent back to a service center, the timing information being correlated towards a distance from network base stations; and field strength and identity of a paging network base station recorded at a moment where the timing information is extracted out of the mobile communications network, the strength being correlated towards a distance from the paging network base station in a vicinity of the module.

12. The method according to claim 1, wherein the signals from or to at least one of the communication networks are coded.

13. The method according to claim 1, wherein the signals from or to at least one of the communication networks is cryptographically transformed.

14. A method according to claim 1, wherein interfaces between the module and said networks are controlled by a control module.

15. The method according to claim 14, wherein said object is a vehicle, and further comprising the step of using a control module which comprises an interface with the vehicle.

16. A method according to claim 15, further comprising the step of using a control module comprising an interface which uses a cryptographic transformation for both authentication and data security in communication with the electrical system of the vehicle.

17. A method according to claim 1, wherein the data from or to at least one of the communication networks are digitally signed for authorization.

18. The method according to claim 1, further comprising the step of using a public key and a private key to make a cryptographic transformation of the signal transmitted over the paging network and for decrypting the signal received over the cellular mobile communications network.

19. The method according to claim 1, further comprising the step of downloading software by means of a receiving interface in said module.

20. The method according to claim 5, wherein the cellular mobile communications network is the Global System for Mobile (GSM) communications network.

21. An apparatus for communicating with an object comprising:

a module mounted on an object to be communicated with, said module including:
an interface with a paging network;
an interface with a cellular mobile communications network; and
an interface with a third local network using a spread spectrum modulation method.

22. The apparatus according to claim 21, wherein the interface with the third local network is an interface with a network using the Code Division Multiple Access (CDMA) method.

23. The apparatus according to claim 22, wherein the interface with the third network comprises a CDMA transmitter interface and a CDMA receiver interface.

24. The apparatus according to claim 21, further comprising a control module for controlling said interfaces.

* * * * *